(12) United States Patent
Pradier et al.

(10) Patent No.: US 7,394,242 B2
(45) Date of Patent: Jul. 1, 2008

(54) TACHOMETER WITH INDEPENDENTLY MOUNTABLE ROTARY AND STATIONARY PARTS FOR AN AIRCRAFT WHEEL

(75) Inventors: Jean-Clair Pradier, Houilles (FR); Thomas Lavaud, Meudon (FR)

(73) Assignee: Messier-Bugatti, Villacoublay (FR)

( * ) Notice: Subject to any disclaimer, the term of this patent is extended or adjusted under 35 U.S.C. 154(b) by 204 days.

(21) Appl. No.: 11/302,201

(22) Filed: Dec. 14, 2005

(65) Prior Publication Data
US 2007/0006650 A1 Jan. 11, 2007

(30) Foreign Application Priority Data
Jul. 11, 2005 (FR) .................................. 05 07377

(51) Int. Cl.
*G01P 3/44* (2006.01)
*G01B 7/30* (2006.01)
(52) U.S. Cl. ................ 324/174; 324/207.25; 324/207.2
(58) Field of Classification Search ......... 324/173–174, 324/207.12–207.25
See application file for complete search history.

(56) References Cited

U.S. PATENT DOCUMENTS

| | | | | |
|---|---|---|---|---|
| 3,473,120 A | * | 10/1969 | Ruof | ........................... 324/162 |
| 3,887,046 A | * | 6/1975 | Bueler | ..................... 188/181 A |
| 4,027,753 A | * | 6/1977 | Lantz | ...................... 188/181 R |
| 4,689,557 A | * | 8/1987 | Smith et al. | .................. 324/174 |
| 5,190,247 A | | 3/1993 | Le Chatelier | |
| 5,260,683 A | * | 11/1993 | Tanaka et al. | ................ 340/448 |
| 6,675,640 B2 | * | 1/2004 | Ehrlich et al. | ............... 73/118.1 |
| 6,843,114 B2 | * | 1/2005 | Pradier et al. | ............... 73/146.5 |
| 2001/0052258 A1 | | 12/2001 | Ehrlich et al. | |
| 2005/0039531 A1 | | 2/2005 | Pradier | |

FOREIGN PATENT DOCUMENTS

| FR | 2718850 A1 * | 10/1995 |
|---|---|---|
| GB | 1-352-725 | 5/1974 |

* cited by examiner

*Primary Examiner*—Jay M Patidar
(74) *Attorney, Agent, or Firm*—Sughrue Mion, PLLC

(57) ABSTRACT

A tachometer for an aircraft wheel mounted on an axle to rotate about an axis of rotation. The tachometer has a stationary part secured to the axle and a rotary part driven in rotation by the wheel. The stationary part and the rotary part are mountable independently on the axle and on the wheel, respectively, and have portions facing each other in a radial direction. A sensor and a target element carried by the stationary and rotary parts portions that extend facing each other in a radial direction and are in register with each other in a radial direction. The portion secured to the rotary part extends inside the axle.

10 Claims, 1 Drawing Sheet

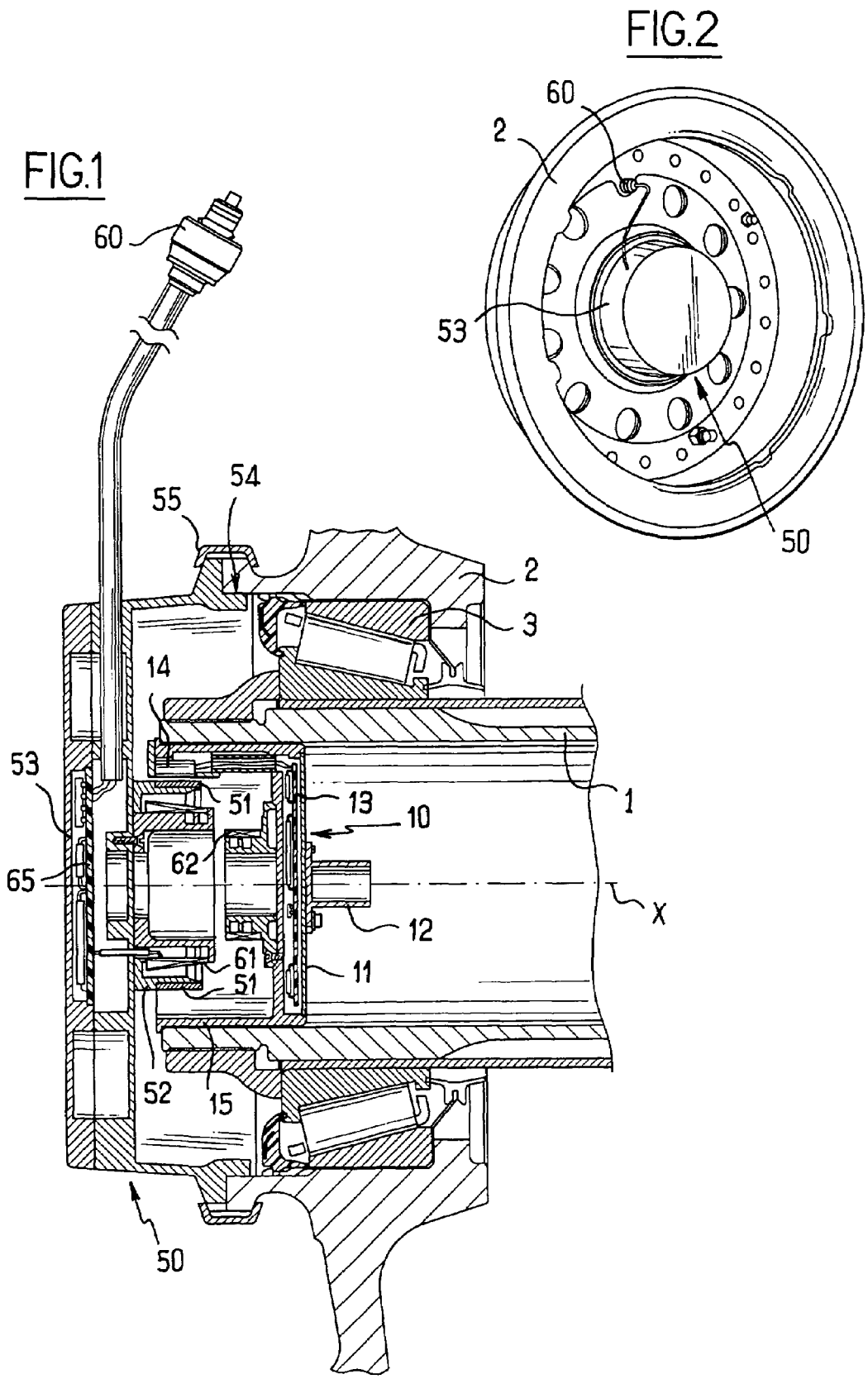

TACHOMETER WITH INDEPENDENTLY MOUNTABLE ROTARY AND STATIONARY PARTS FOR AN AIRCRAFT WHEEL

The present invention relates to a tachometer for an aircraft wheel.

BACKGROUND OF THE INVENTION

Tachometers are known for aircraft wheels that are mounted on axles to turn about axes of rotation. A tachometer comprises a stationary part for securing to the axle and a rotary part for being rotated by the wheel. One of the parts, generally the stationary part, includes a remote sensor adapted to co-operate with an indicator element carried by the other part in order to generate information about the speed of rotation of the wheel. For example the sensor may be of the variable reluctance type.

Such a sensor is known from document US 2001/0052258. The stationary and rotary parts comprise portions that extend facing each other in a radial direction, the remote sensor and the indicator element being carried by said portions so as to be in register with each other in a radial direction. In this case, the portion of the rotary part that carries the indicator element extends around the portion of the stationary part that carries the remote sensor.

It is thus necessary to reserve enough space beyond the end of the axle to be able to install the sensor and the indicator element, thereby increasing the bulkiness of the tachometer.

OBJECT OF THE INVENTION

An object of the invention is to provide a compact tachometer.

BRIEF SUMMARY OF THE INVENTION

In order to achieve this object, the invention provides tachometer for an aircraft wheel mounted on an axle to rotate about an axis of rotation, the tachometer comprising a stationary part for securing to the axle and a rotary part for being driven in rotation by the wheel, one of the stationary part and the rotary part including a remote sensor adapted to co-operate with an indicator element carried by the facing other part of the sensor in order to generate information about the speed of rotation of the wheel, the stationary and rotary parts having portions that extend facing each other in a radial direction, the remote sensor and the indicator element being carried by the portions so as to be in register with each other in a radial direction. According to the invention, in operation, the portion secured to the rotary part extends inside the axle.

The sensor and the indicator element can thus be disposed, at least in part, inside the axle, thereby making the tachometer of the invention axially more compact.

BRIEF DESCRIPTION OF THE DRAWING

The invention will be better understood in the light of the following description given with reference to the accompanying drawing, in which:

FIG. 1 is a longitudinal section view of an aircraft axle fitted with a wheel and a tachometer of the invention; and FIG. 2 is a fragmentary perspective view of the FIG. 1 wheel.

DETAILED DESCRIPTION OF THE INVENTION

With reference to FIG. 1, the tachometer of the invention is for mounting at the end of an aircraft axle 1. The axle 1 receives an aircraft wheel 2 of which the drawing shows a portion of the rim. The wheel is guided in rotation on the axle by conical rolling bearings 3 (the outer bearing element is shown) so as to enable the wheel 2 to rotate about an axis X that coincides with the axis of symmetry of the axle 1.

The tachometer has a stationary part 10 inserted in the end of the axle 1 and prevents it from rotating by stop means (not shown herein), e.g. a screw. To this end, the stationary part 10 includes a hollow cylindrical portion 15 that extends fully into the axle 1, and that forms a centering member for centering the stationary part 10 on the axle 1.

The stationary part 10 has an end partition 11 receiving a connector 12 adapted to receive a complementary connector (for connecting the tachometer to the systems of the aircraft via a cable passing along the inside of the axle 1).

The connector 12 is connected to a printed circuit card 13 that carries electronics for processing tachometer signals and that is housed in a compartment that extends behind the end partition 11.

The printed circuit card 3 is connected to a Hall effect sensor 14 that is disposed in a housing at the end of the hollow cylindrical portion 15 of the stationary part 10 and that presents a detection zone facing radially towards the axis X.

The tachometer further comprises a rotary part 50 which, according to the invention, is secured to the wheel 2.

The rotary part 50 has magnetic targets 51, in this case permanent magnets, that are carried on the cylindrical outer surface of a cylindrical portion 52 of the rotary part 50 that penetrates into the stationary part 10 so as to be in register with the cylindrical portion 15 of the stationary part 10 in a radial direction such that the magnetic targets 51 come into register with the Hall effect sensor 14 in a radial direction. The cylindrical portion 52 is secured to a cap-forming structure 53 that protects the end of the axle and that forms the externally visible portion of the tachometer, as can be seen in FIG. 2. The cap 53 and the cylindrical portion 52 are essentially bodies of revolution extending on a common axis of revolution.

According to the invention, the cap 53 is fitted onto the wheel 2, and for this purpose it has a cylindrical bearing surface 54 that co-operates with a complementary bearing surface of the wheel 2 so as to center the cap 53 relative to the wheel 2, and thus center the cylindrical portion 52 on the axis of rotation X. The rotary part 50 is secured and prevented from rotating on the wheel 2 by means of a peripheral clamping collar 55 clamping together a conical bearing surface of the cap 53 and a symmetrical conical bearing surface of the rim of the wheel 2.

By centering the cap 53 on the wheel 2 the rotary part 50 and the stationary part 10 are also centered on the same axis X without any need for a rotary guide device to extend between the stationary part 10 and the rotary part 50. The stationary part 10 and the rotary part 50 thus constitute two independent elements that can be mounted independently of each other on the associated element (wheel or axle). The tachometer of the invention is thus simpler and less expensive to produce than are existing tachometers.

In operation, when the magnetic targets 51 pass in front of the Hall effect sensor 14, they generate information relating to the speed of rotation of the wheel 2 by a method that is itself known. Given the dimensions of aircraft wheels and centering tolerances, it is possible to guarantee a determined distance between the sensor 14 the magnetic targets where said distance is determined with tolerance of millimeter order, which is ample for guaranteeing proper operation of the sensor 14.

Uncertainty in the axial position between the rotary part and the stationary part can be large, of the order of several millimeters. Having the sensor 14 co-operate in a radial direction with the magnetic targets 51 makes it possible to reduce considerably the sensitivity of the tachometer to the axial positioning of the rotary part 50 relative to the stationary part 10. To eliminate such sensitivity, it suffices (as shown) to give the magnetic targets 51 an axial extent such that regardless of the axial positioning of the rotary part relative to the stationary part (within the limits of the possible range of positions), the magnetic targets 51 always remain in register with the sensor 14 in a radial direction.

In the invention, the sensor 14 is carried by the cylindrical portion 15 so that it extends substantially at the end of the axle 1. The cylindrical portion 52 of the rotary part 50 penetrates into the axle 1 so as to be in register with the cylindrical portion 15 of the stationary part 10, and it brings the magnets 51 into register with the sensor 14, i.e. inside the axle 1.

Thus, the assembly formed by the sensor 14 and by the magnets 51 is housed in the axle 1, thereby enabling the tachometer of the invention to be axially more compact.

In a particular aspect of the invention, the rotary part includes an auxiliary pressure sensor 60 of the piezoelectric type that extends at the end of a cable projecting from the cap 53 and that is plugged into the wheel rim 2, as can be seen in FIG. 2, in order to measure the pressure that exists inside the tire (not shown here) carried by the rim.

The piezoelectric element of the pressure sensor 60 is connected to an electronic circuit 65 disposed in the rotary part 50. The electronic circuit 65 is connected to a first coil 61 carried internally by the cap 53 and extending in the proximity of a complementary second coil 62 carried by the stationary part 10 and electrically connected to the printed circuit card 13.

The first coil 61 co-operates with the pressure sensor 60 and the electronic circuit 65 to form a closed circuit such that the electromagnetic characteristics of the first coil 61 depend on the electrical state of the pressure sensor 60, and thus on the pressure that exists inside the tire.

The two coils 61 and 62 interact electromagnetically. In operation, the second coil 62 is powered, and the voltage across the terminals of the second coil 62 depends on the electromagnetic characteristics of the first coil 61, and thus on the pressure in the tire. The voltage across the terminals of the second coil 62 thus constitutes a signal representative of the pressure that exists inside the tire.

The pressure signal, like the speed signal, is thus generated without any contact or guidance between the stationary part 10 and the rotary part 50 of the tachometer.

The invention is not limited to the above description, but on the contrary covers any variant coming within the ambit defined by the claims.

In particular, although the tachometer is shown as having a rotary speed sensor mounted on the stationary part for co-operating remotely with an indicator element (the electro-magnetic targets) carried by the rotary part, it would naturally be possible to mount the sensor on the rotary part and the indicator element on the stationary part. It would also be possible to provide more than one sensor so as to provide redundancy in the information about the speed of rotation.

Although it is stated that the rotary speed sensor is a magnetic sensor of the Hall effect type, other contactless sensors could be used, e.g. such as a magnetoresistive or a magnetostrictive magnetic type sensor, or indeed an optical sensor.

Although a tachometer is shown that is fitted with an auxiliary pressure sensor, the tachometer of the invention is not limited to that particular disposition and need not have any auxiliary sensor, or indeed it could have other types of auxiliary sensor for example strain gauges for measuring bending of the axle.

Although the centering means for centering the rotary part on the wheel in this case comprise a cylindrical centering bearing surface, any other centering means could be envisaged, such as, for example, a conical centering bearing surface or indeed positioning by means of pegs adapted to ensure that the rotary part is centered on the wheel.

Similarly, although the rotary drive means in this case comprise a clamping collar, any other drive member could be envisaged, such as a dog or fixing screws, for example.

Finally, although it is stated that the portion of the rotary part that extends into the axle in order to carry one of the sensor or of the indicator element extends inside the portion in register with the stationary part (in this case constituted by the cylindrical portion that serves to center the stationary part on the axle), it is also possible to envisage that the portion of the stationary part that carries the other one of the sensor and of the indicator element extends inside the portion in register with the rotary part. In this case, the portion of the stationary part could no longer serve to center the stationary part on the axle. The stationary part must thus include a centering member that is distinct from said portion.

What is claimed is:

1. A tachometer for an aircraft wheel mounted on an axle to rotate about an axis of rotation, the tachometer comprising:
a stationary part to be secured to the axle and an independent rotary part to be secured to the wheel,
wherein the stationary part and the rotary part are mountable independently on the axle and on the wheel, respectively, said stationary part and said rotary part having portions facing each other in a radial direction, one of said portions carrying a sensor and another one of said portions carrying a target element, so that said sensor and said target element are in register in a radial direction and cooperate for generating a signal indicative of a rotation speed of the rotary part, and
wherein the portion of the rotary part extends inside the axle when the rotary part is mounted on the wheel so that the target and the sensor extend at least partially inside the axle.

2. A tachometer according to claim 1, in which the sensor is of the magnetic type and the target element comprises a plurality of magnetic targets.

3. A tachometer according to claim 1, in which the sensor is carried by the stationary part while the target element is carried by the rotary part, the sensor being electrically connected to electronics carried by the stationary portion.

4. A tachometer according to claim 1, in which the portion of the rotary part extends inside the portion of the stationary part.

5. A tachometer according to claim 4, wherein the sensor and the target element extend substantially at an end of the axle.

6. A tachometer according to claim 5, in which the rotary part comprises a protective cap having a centering bearing surface matching with a complementary centering bearing surface of the wheel so as to center the cap relative to the wheel.

7. A tachometer according to claim 6, comprising a peripheral clamping collar to fasten the cap on the wheel by clamping together a conical bearing surface of the cap and a corresponding conical bearing of the wheel.

8. A tachometer according to claim 1, further comprising:
a first coil carried by the rotary part,
a pressure sensor sensitive to a pressure in a type supported by the wheel, said pressure sensor being electrically connected to the first coil to influence electromagnetic characteristics thereof according to said pressure,
a second coil carried by the stationary part in the proximity of said first coil to electromagnetically interact with said first coil, so that said second coil has, when powered, a voltage which depends on said pressure.

9. A tachometer according to claim 8, in which the pressure sensor is connected to electronics carried by the rotary part.

10. A tachometer according to claim 8, in which the second coil is connected to electronics carried by the stationary part.

\* \* \* \* \*